United States Patent [19]

Schreck et al.

[11] 4,385,072
[45] May 24, 1983

[54] USE OF ESTERS OF 1-ACETYL CYCLOHEXANOL IN AUGMENTING OR ENHANCING THE AROMA OR TASTE OF FOODSTUFFS

[75] Inventors: Ronald P. Schreck, Old Bridge, N.J.; Kenneth K. Light, North Ogden, Utah; John B. Hall, Rumson, N.J.; Frederick L. Schmitt, Holmdel, N.J.; Manfred H. Vock, Locust, N.J.; William L. Schreiber, Jackson, N.J.; Joaquin F. Vinals, Red Bank, N.J.; Jacob Kiwala, Brooklyn, N.Y.

[73] Assignee: International Flavors & Fragrances Inc., New York, N.Y.

[21] Appl. No.: 313,686

[22] Filed: Oct. 22, 1981

Related U.S. Application Data

[62] Division of Ser. No. 133,828, Mar. 25, 1980, Pat. No. 4,327,749.

[51] Int. Cl.³ .................... A23L 1/226; A23L 1/235
[52] U.S. Cl. .................................. 426/3; 426/538
[58] Field of Search .................... 426/538, 3

[56] References Cited

U.S. PATENT DOCUMENTS 4,081,479  3/1978  Hall et al. ............... 426/538 X
4,107,093  8/1978  Sprecker et al. ........ 426/538 X
4,147,727  4/1979  Sprecker et al. ........ 426/538 X
4,292,447  9/1981  Trenkle et al. ......... 426/538 X Primary Examiner—Joseph M. Golian
Attorney, Agent, or Firm—Arthur L. Liberman

[57] ABSTRACT

Described is a process for augmenting or enhancing the aroma or taste of foodstuffs and chewing gums comprising the step of adding to a foodstuff composition or chewing gum composition, an aroma or taste augmenting or enhancing quantity of at least one of the two compounds having the structures:

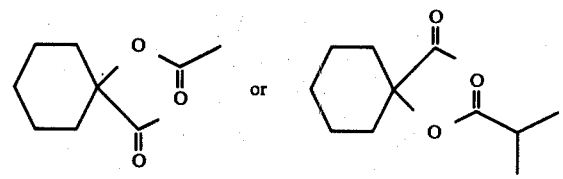

3 Claims, No Drawings

USE OF ESTERS OF 1-ACETYL CYCLOHEXANOL IN AUGMENTING OR ENHANCING THE AROMA OR TASTE OF FOODSTUFFS

This application is a divisional of application for United States Letters Patent Ser. No. 133,828 filed on Mar. 25, 1980, now U.S. Pat. No. 4,327,749 issued on May 4, 1982.

BACKGROUND OF THE INVENTION

The present invention provides compounds having the generic structure:

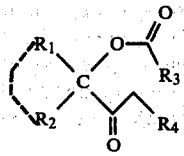

wherein $R_1$ and $R_2$ taken together complete a cycloalkyl moiety or methyl, dimethyl or trimethyl substituted cycloalkyl moiety containing five or six carbon atoms in the ring and wherein $R_3$ is $C_1$–$C_3$ lower alkyl and $R_4$ is methyl or hydrogen. Such compounds are provided by a novel process of our invention as shown by the reaction:

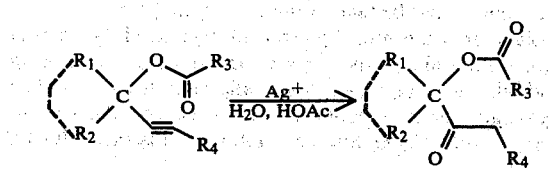

The compounds produced using the process of our invention are useful for their organoleptic properties in perfumes, perfumed articles, foodstuffs, foodstuff flavoring compositions, chewing gums, toothpastes, medicinal products, smoking tobaccos and smoking tobacco flavoring compositions, substitute smoking tobaccos and substitute smoking tobacco flavoring compositions.

In the perfumery art, there is a considerable need for substituents having sweet, fruity (figgy, raspberry-like), floral/rose-like, honey-like, rich, fruity (apple), green, floral/herbaceous, minty, camphoraceous, green, orris, leathery, earthy and peppery nuances with tobacco undertone. Specifically described herein are materials having such organoleptic profiles but which do not discolor with age. Such fragrance materials have a wide utilization in the presence of perfume compositions. A limited amount of such materials that give rise to these properties alone or in combination is available from natural sources, but the natural materials are subject to wide variations in quality, or are expensive and/or often in critically short supply.

In addition, there is a continuing search for food flavor compositions which can vary, fortify, modify, enhance, augment or otherwise improve the flavor and/or aroma of foodstuff, medicinal products, toothpastes, chewing gums and chewing tobaccos. To be satisfactory, such compositions should be stable, non-toxic and blendable with other ingredients to provide their own unique flavor and aroma nuances without detracting from the co-ingredients of the formulations in which they are used. Preferably, such compositions should be naturally occurring or present in natural foodstuffs so that their ingestible safety can be readily recognized. These materials should be capable of being synthesized in a simple and economical manner. The need for safe flavors in the raspberry, plum, strawberry and fruit juice-like flavor area is well known particularly in the ice cream and yogart flavor areas. More specifically, there is a need for the development of non-toxic materials which can replace natural materials not readily available having floral, green, fruity, sweet, estery, strawberry-like and ionone-like aroma nuances with sweet, floral, green/berry, strawberry-like, plum-like, fruit juice-like, raspberry juice-like, green, bitter, fruity, estery, earthy, astringent and ionone-like flavor nuances.

In the tobacco flavoring art (pertaining to smoking tobaccos and substitute smoking tobaccos) there is a considerable need for adjuvants for smoking tobacco and substitute smoking tobacco having sweet, minty, cooling, spicey, anisic, berry-like, fruity, pineapple-like, woody, green, pepper-like and dill-like aromas and tastes prior to smoking and on smoking in both the main stream and in the side stream and resulting from adding the adjuvants to tobacco per se, to the wrapper or to the filter or to combinations of the parts of the smoking tobacco article.

The instant invention provides the foregoing which the prior art has heretofore failed to provide. Furthermore, nothing in the prior art shows the unexpected, unobvious and advantageous value for their organoleptic properties of the genus of compound defined according to the structure:

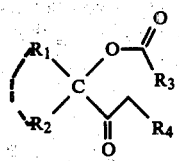

wherein $R_1$ and $R_2$ taken together complete a cycloalkyl moiety or a methyl, dimethyl or trimethyl cycloalkyl moiety containing five or six carbon atoms in the ring and wherein $R_3$ is $C_1$–$C_3$ lower alkyl and $R_4$ is methyl or hydrogen.

The prior art has already taught the reaction of alkyl substituted acetylene derivatives or mono-substituted acetylene derivatives to form ketones. Indeed, Stacy and Mikulec, Org. Synth. Coll., Vol. IV (1963) 13 teaches the reaction:

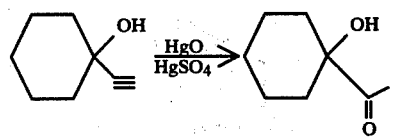

but does not discuss the use of metallic catalysts alternative to those containing mercury for such a reaction. Beilstein, Vol. 8, Supplement 3 teaches the reaction:

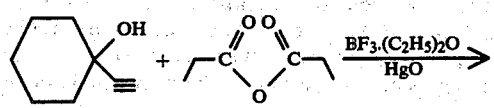

-continued

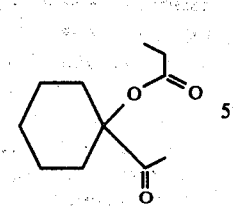

and Johnson "The Chemistry of Acetylenic Compounds", Vol. I, Edward Arnold & Company, London, 1946 at page 103 teaches the reaction:

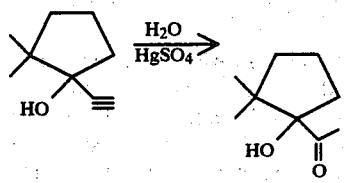

Nothing in the prior art shows the use in such a reaction of a silver ion catalyst without the addition of mineral acid. The silver is recoverable by precipitation of such salts as silver chloride or silver bromide. Such a mild acetylenic hydration is known in cases where catalysis using mercury compounds is used but use of silver is greatly advantageous particularly since mercury is toxic and there is a great likelihood of the mercury compound to contaminate equipment and create various hazardous situations.

Arctander "Perfume and Flavor Chemicals (Aroma Chemicals)", Vol. I, (1969), at monograph No. 37 discloses the use of acetyl cyclohexanol in perfumery and in perfumed articles indicating that acetyl cyclohexanol having the structure:

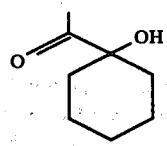

has a camphoraceous, minty, herbaceous, somewhat floral odor. Arctander further indicates that this material is produced by "hydration of 1-ethynyl-cyclohexanol".

United Kingdom Pat. No. 1,344,653 published on Jan. 23, 1974 discloses the use in perfumery of certain carbo cyclic odorants possessing the following structure:

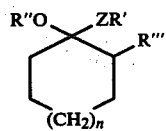

where R' is hydrogen or methyl, R" is hydrogen or $C_1$–$C_3$ alkanoyl, R''' is butyl, n is 0, 1 or 2, Z is one of the radicals —C≡C—, —CH=CH— or —CH$_2$—CH$_2$—.

Neither the Arctander disclosure nor the Givaudan United Kingdom Pat. No. 1,344,653 disclosure teaches either explicitly or implicitly the unexpected, unobvious and advantageous properties of the compounds of the instant application.

THE INVENTION

The present invention provides compounds having the generic structure:

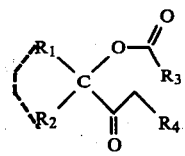

wherein $R_1$ and $R_2$ taken together complete a cycloalkyl moiety or a methyl, dimethyl or trimethyl cycloalkyl moiety containing five or six carbon atoms in the ring and wherein $R_3$ is $C_1$–$C_3$ lower alkyl and $R_4$ is methyl or hydrogen. The present invention also provides a process for preparing such compounds by hydrating the triple bond of the compounds defined according to the genus:

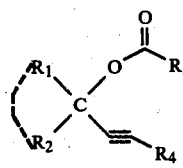

wherein $R_1$ and $R_2$ taken together complete a cycloalkyl moiety or a methyl, dimethyl or trimethyl cycloalkyl moiety containing five or six carbon atoms in the ring and wherein $R_3$ is $C_1$–$C_3$ lower alkyl and $R_4$ is methyl or hydrogen using aqueous silver ion catalyst in a weak organic acid media. Such a reaction is illustrated thusly:

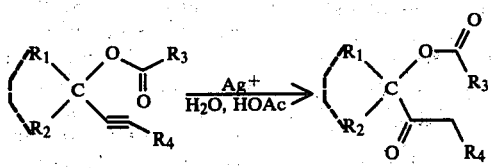

The 1-acylcycloalkyl alkanoates of our invention produced according to the process of our invention are capable of augmenting or enhancing the strawberry, raspberry or plum fruit flavors by imparting thereto a floral, green, fruity, sweet, estery, strawberry-like and-/or ionone-like aroma characteristics and sweet, floral, green/berry, strawberry, plum-like, fruit juice-like, raspberry juice-like, green, bitter, fruity, estery, earthy, astringent and ionone-like flavor characteristics.

The 1-acylcycloalkyl alkanoates of our invention are produced by reacting a compound having the structure:

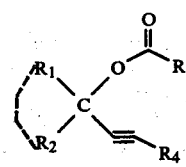

with a silver ion catalyst in aqueous media and in weak organic acid media. Thus, the concentration of silver ion (as silver nitrate, for example,) may vary from about 0.1% up to about 6 mole percent in the reactant solution. The temperature of reaction may vary from about 65° C. up to about 100° C. when using atmospheric pressure and may range up to about 120° C. when using pressures above atmospheric for carrying out this reaction. However, pressures above atmospheric do not create any particular advantages in the carrying out of this reaction. The reaction is carried out in a weak organic acid such as acetic acid, propionic acid, n-butyric acid or isobutyric acid. The ratio of water: organic acid is such that a homogeneous mixture must be obtained at the reaction temperature used when the starting material is added. The ratio of water to organic acid (mole ratio) may vary from about 0.1:1 up to about 2:1 water::organic acid.

The time of reaction may vary from about 2 hours up to about 6 hours depending on the desired yield of end product. During the first hour, the acetylenic derivative having the generic structure:

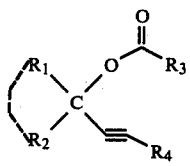

is added to the aqueous solution containing the silver ion and the organic acid. Initially, the mixture of silver ion and organic acid is heated up to the desired temperature at which the reaction is to be carried out. While the reaction mass temperature is maintained, the acetylenic compound having the generic structure is slowly added thereto over a period of between one and three hours. After the addition of acetylenic compound having the structure:

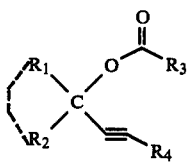

the reaction mass preferably is continued to be stirred at the temperature of the reaction until analysis (e.g., via GLC) indicates that no additional acyl cycloalkyl alkanoate having the generic structure:

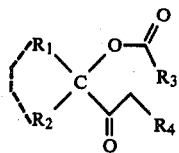

is formed. During the reaction, in addition to the 1-acyl-cycloalkyl alkanoate having the structure:

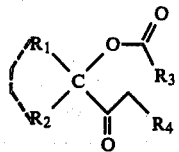

being formed, allenic compounds may also be formed and these allenic compounds have the structure, for example:

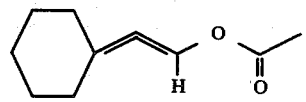

The allenic compounds, when they are formed, are removed from the reaction mass after appropriate work-up of the reaction mass by means of fractional distillation. In addition, the acyl cycloalkyl alkanoates having the generic structure:

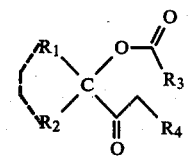

is purified by routine fractional distillation.

The compounds of our invention may also be formed by esterification with the appropriate alkanoic acid anhydride or alkanoyl halide of the hydroxy acetyl cyclohexane or hydroxy acetyl cyclopentane, for example, the compound having the structure:

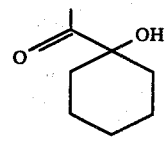

When one or more of the 1-acylcycloalkyl alkanoates of our invention is used as a food flavor adjuvant, the nature of the co-ingredients included with said one or more 1-acylcycloalkyl alkanoates in formulating the product composition will also serve to alter the organoleptic characteristics of the ultimate foodstuffs treated therewith. As used herein, in regard to flavors, the term "alter" in its various forms means "supplying or imparting flavor character or notes to otherwise bland relatively tasteless substance or augmenting the existing flavor characteristic where a natural flavor is deficient in some regard or supplementing the existing flavor impression to modify its quality, character or taste".

As used herein, the term "foodstuff" includes both solid and liquid ingestible materials which usually do but need not have nutritional value. Thus, foodstuffs include soups, convenience foods, beverages, dairy products, candies, fruits, cereals, soft drinks, snacks and the like.

Substances suitable for use herein as co-ingredients or flavoring adjuvants are well known in the art for such use being extensively described in the relevant literature. Apart from the requirement that any such material be "ingestibly" acceptable and thus non-toxic or otherwise non-deleterious nothing particularly critical resides in selection thereof. Accordingly, such materials which may in general be characterized as flavoring adjuvants or vehicles comprising broadly stabilizers, thickeners, surface active agents, conditioners, other flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, and sequestrants, e.g., citric acid.

Thickener compounds include carriers, binders, protective collois, suspensing agents, emulsifiers and the like, e.g., agaragar; carrageenan; cellulose and cellulose derivatives such as carboxymethyl cellulose and methyl cellulose; natural and synthetic gums such as gum arabic, gum tragancanth; gelatine; proteinaceous materials; lipids; carbohydrates; starches pectins, and emulsifiers, e.g., mono- and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like, colorants, e.g., carminic acid, cochineal, turmeric and curcumin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, butyric acid, caproic acid, caprylic acid, formic acid, 2-hexenoic acid, 3-hexenoic acid, isobutyric acid, isovaleric acid, propionic acid and valeric acid; ketones and aldehydes, e.g., acetaldehyde, acetone, acetyl methyl carbinol, acrolein, diacetyl, $\beta,\beta$-dimethylacrolein, hexanal, 2-hexenal, cis-3-hexenal, 4(p-hydroxyphenyl)-2-butanone, $\alpha$-ionone, $\beta$-ionone, and 2-pentenal; alcohols, such as 1-butanol, trans-2-buten-1-ol, ethanol, gernaiol, 1-hexanol, cis-3-hexen-1-ol, 3-methyl-3-buten-1-ol, 1-pentanol, 1-penten-3-ol; esters, such as butyl acetate, ethyl acetate, ethyl butyrate, ethyl crotonate, ethyl propionate, 2-hexenyl acetate, 2-hexenyl butyrate, hexyl acetate, hexyl butyrate, isoamyl acetate, isopropyl butyrate, methyl butyrate, methyl caproate, methyl caprylate, propyl acetate, amyl acetate, amyl butyrate, benzyl salicylate, dimethyl anthranilate, ethyl methylphenylglycidate, ethyl succinate, isobutyl cinnamate, and terpenyl acetate; essential oils such as jasmine absolute, rose absolute, orris absolute, lemon essential oil and vanilla; lactones; sulfides, e.g., methyl sulfide and other materials such as maltol and citral as well as natural raspberry oil and natural strawberry juice concentrate.

The specific flavoring adjuvants selected for use may be either solid or liquid, depending upon the desired physical form of the ultimate product, i.e., foodstuff, whether simulated or natural, and should, in any event, be capable of providing an environment in which the one or more 1-acylcycloalkyl alkanoates of our invention can be disbursed or admixed to provide a homogeneous medium. In addition, selection of one or more adjuvants, as well as the quantities thereof, will depend upon the precise organoleptic raspberry character, strawberry character or plum character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of one or more 1-acylcycloalkyl alkanoates of our invention employed in a particular instance can vary over a relatively wide range whereby its desired organoleptic effects (having reference to the nature of the product) are achieved. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for the purposes of enhancing the composition merely deficient in natural flavor or aroma. Thus, the primary requirement is that amount which is effective, i.e., sufficient to alter the organoleptic characteristics of the parent composition, whether foodstuff per se or flavoring composition. Thus, the use of insufficient quantities of one or more 1-acylcycloalkyl alkanoates will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus and with respect to ultimate food compositions, it has been found that quantities of one or more 1-acylcycloalkyl alkanoates ranging from a small but effective amount, e.g., 0.02 parts per million up to about 50 parts per million by weight based on total composition are suitable. Concentrations in excess of the maximum quantity stated are not normally recommended since they fail to provide commensurate enhancement of organoleptic properties. In those cases wherein the one or more 1-acylcycloalkyl alkanoates is added to the foodstuff as an integral component of the flavoring composition, it is, of course, essential that the total quantity of flavoring composition employed be sufficient to yield an effective one or more 1-acylcycloalkyl alkanoate concentration in the foodstuff product.

Food flavoring compositions prepared in accordance with the present invention preferably contain one or more 1-acylcycloalkyl alkanoate in concentrations ranging from about 0.05% up to about 10% by weight based on a total weight of said flavoring composition.

The compositions described herein can be prepared according to conventional techniques well known as typified by cake batters and fruit juices and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing one or more 1-acylcycloalkyl alkanoate with, for example, gum arabic, gum tragacanth, carrageenan and the like and thereafter spray-drying the resultant mixture whereby to obtain the particulate solid product. Prepared flavor mixes in powder form, e.g., a raspberry flavored powder are obtained by mixing dried solid, components, e.g., starch, sugar and the like and one or more 1-acylcycloalkyl alkanoate in a dry blender until the requisite degree of uniformity is achieved.

It is presently preferred to combine the one or more 1-acylcycloalkyl alkanoate with the following adjuvants:
Parahydroxybenzyl acetone;
Vanillin;
Maltol;
α-Ionone;
β-Ionone;
Isobutyl acetate;
Ethyl butyrate;
Dimethyl sulfide;
Acetic acid;
Acetaldehyde;
4-(2,6,6-trimethyl-1,3-cyclohexadien-1-yl)-2-butanone;
4-(6,6-dimethyl-2-methylene-3-cyclohexen-1-yl)-2-butanone
2-(4-hydroxy-4-methylpentyl)norbornadiene produced according to Example I of U.S. Pat. No. 3,911,028
β-Damascone (1-crotonyl-2,6,6-trimethylcyclohex-1-ene);
β-Damascenone (1-crotonyl-2,6,6-trimethylcyclohexa-1,3-diene);
Beta-cyclohomocitral (2,6,6-trimethylcyclohex-1-ene carboxaldehyde)
Isoamyl butyrate;
Cis-3-hexenol-1;
2-Methyl-2-pentenoic acid;
Elemecine (4-allyl-1,2,6-trimethoxybenzene);
Isoelemecine (4-propenyl-1,2,6-trimethoxybenzene);
Cis-2,3-methyl pentenoic acid;
Ethyl-2-methyl-3-pentenoate; and
Isobutyl-cis-2-methyl-3-pentenoate The following examples serve to illustrate our invention but our invention is only intended to be limited as indicated in the appended claims. All parts and percentages given herein are by weight unless otherwise specified.

EXAMPLE I

PREPARATION OF 1-ACETYL-CYCLOHEXYL ACETATE

Reaction

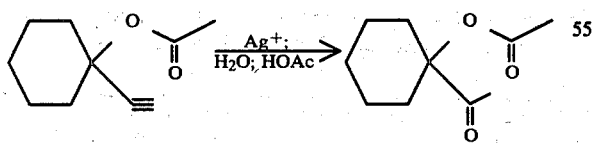

Into a 500 ml reaction flask equipped with thermometer, stirrer and addition funnel and heating mantle is placed 75 ml water, 75 ml acetic acid and 1.5 grams of silver nitrate. The resulting mixture is heated to 80° C. While maintaining the temperature of the reaction mass at 80° C., 150 grams of 1-ethynyl cyclohexyl acetate is added over a period of 1.5 hours. The reaction mass is then quenched with 230 ml of a 20% aqueous sodium chloride solution causing the silver ion catalyst to precipitate as, interalia, silver chloride. The reaction mass is then filtered through a Buchner funnel. The resulting liquid exists in two phases, an organic phase and an aqueous phase. The organic phase is washed with two 250 ml volumes of water followed by one 250 ml saturated sodium bicarbonate solution portion followed by one 250 ml saturated sodium chloride solution.

FIG. 1 sets forth the GLC profile for the resulting product. (Conditions: 100°-200° C. at 8° C. per minute/10% Carbowax column).

The resulting material is then distilled on a 3 foot distillation column yielding the following fractions:

| Fraction No. | Vapor Temp. | Liquid Temp. | mm Hg Pressure | Reflux Ratio | Wgt. of Fraction |
|---|---|---|---|---|---|
| 1 | 30/57 | 56/96 | 3.0 | 10:1 | 8.9 |
| 2 | 56 | 93 | 3.0 | 10:1 | 9.9 |
| 3 | 68 | 100 | 3.0 | 10:1 | 3.8 |
| 4 | 76 | 100 | 3.0 | 10:1 | 11.0 |
| 5 | 78 | 98 | 3.0 | 10:1 | 10.2 |
| 6 | 79 | 99 | 3.1 | 10:1 | 14.7 |
| 7 | 80 | 99 | 3.1 | 10:1 | 14.2 |
| 8 | 78 | 98 | 3.0 | 10:1 | 10.8 |
| 9 | 77 | 98 | 3.0 | 10:1 | 14.0 |
| 10 | 79 | 100 | 3.1 | 10:1 | 12.3 |
| 11 | 40 | 220 | 3.0 | 10:1 | 8.0 |

Of the foregoing eleven fractions, "A" represents forerun, "B" represents the compound having the structure:

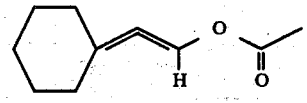

and "C" represents the compound having the structure:

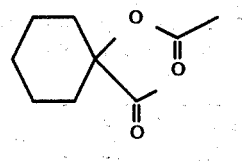

thusly:

| Fraction No. | Weight of Fraction | "A" % | "B" % | "C" % |
|---|---|---|---|---|
| 1 | 8.9 | 95.6 | 1.1 | 3.3 |
| 2 | 9.9 | 100.0 | — | — |
| 3 | 3.8 | 85.1 | 7.7 | 7.2 |
| 4 | 11.0 | 13.7 | 36.1 | 50.2 |
| 5 | 10.2 | — | — | — |
| 6 | 14.7 | — | 21.6 | 78.4 |
| 7 | 14.2 | — | — | — |
| 8 | 10.8 | — | 4.0 | 96.0 |
| 9 | 14.0 | — | — | — |
| 10 | 12.3 | — | — | 99.8 |
| 11 | 8.0 | — | — | 100.0 |

Fractions 6-10 are bulked and the combined fractions are evaluated for their organoleptic properties. The bulked fractions has a complex floral, fruity, honey aroma with a nutty and cinnamic undertone.

EXAMPLE II

PREPARATION OF 1-ACETYL CYCLOHEXYL PROPIONATE

Reaction:

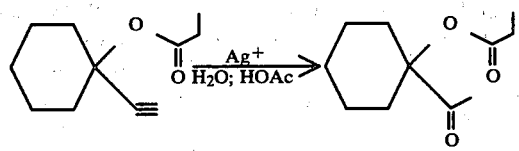

Into a one liter reaction flask equipped with stirrer, thermometer, heating mantle, reflux condenser and addition funnel is placed 200 grams water and 4 grams of silver nitrate and, in addition, 200 grams propionic acid. The resulting mixture is heated to 75° C. and, while maintaining the temperature of the reaction mass in the range of 75°–80° C. and over a period of 1.5 hours, 1-ethynyl cyclohexyl propionate is (400 grams) is added to the reaction mass. At the end of the addition of the 1-ethynyl cyclohexyl propionate, the temperature of the reaction mass is raised to reflux and heated at reflux (97° C.) for four hours.

The reaction mass is then quenched with 250 ml 20% aqueous sodium chloride solution and the silver chloride is then filtered from the reaction mass.

The organic layer is washed with 500 ml water (one portion) followed by two portions 250 ml saturated sodium bicarbonate and one portion 500 ml saturated sodium chloride solution. The organic layer is then distilled on a "Rushover" column yielding the following fractions:

| Fraction No. | Vapor Temp. | Liquid Temp. | mm. Hg. Pressure | Weight of Fraction |
|---|---|---|---|---|
| 1 | 34/36 | 60/100 | 3 mm | 182 |
| 2 | 57/103 | 90/110 | 3 mm | 140 |
| 3 | 103 | 189 | 3 mm | 125 |

The material is then redistilled on a fractionation column yielding the following eleven fractions:

| Fraction No. | Vapor Temp. | Liquid Temp. | mm. Hg. Pressure | Weight of Fraction |
|---|---|---|---|---|
| 1 | 41/55 | 90/98 | 3 mm | 27.5 |
| 2 | 56 | 102 | 3 mm | 18.9 |
| 3 | 81 | 104 | 3 mm | 15.5 |
| 4 | 85 | 105 | 3 mm | 26.9 |
| 5 | 85 | 105 | 3 mm | 25.8 |
| 6 | 85 | 105 | 3 mm | 25.4 |
| 7 | 85 | 106 | 3 mm | 22.5 |
| 8 | 85 | 106 | 3 mm | 22.0 |
| 9 | 83 | 107 | 3 mm | 17.0 |
| 10 | 83 | 122 | 3 mm | 20.5 |
| 11 | 81 | 215 | 3 mm | 13.7 |

The compound having the structure:

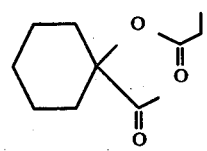

has a rich, fruity (apple) floral (rose) slight green aroma.

EXAMPLE III

PREPARATION OF 1-ACETYL CYCLOHEXYL ISOBUTYRATE

Reaction

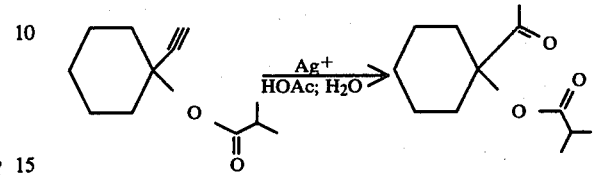

Into a one liter reaction flask equipped with stirrer, thermometer, reflux condenser, addition funnel and heating mantle is placed a mixture of 3.5 grams silver nitrate dissolved in 115 grams of water. 115 Grams of acetic acid is then added to the silver nitrate solution and the resulting mixture is heated to 80° C. The reaction mass is maintained at 80° C. while adding 230 grams of 1-ethynyl cyclohexyl isobutyrate having the structure:

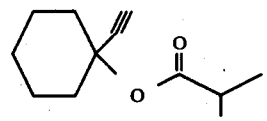

to the reaction mass (230 grams) over a period of 1.75 hours while maintaining the reaction temperature at 80° C. The reaction mass is then maintained with stirring at 80° C. for a period of 5 hours. The reaction mass is then cooled to ambient temperature (25° C.) and quenched with 230 ml 10% hydrochloric acid. The reaction mass is then filtered and the resulting organic layer is washed with 500 ml 10% sodium carbonate solution to a pH of 9 followed by a 500 ml portion of saturated aqueous sodium chloride solution. The resulting product is distilled on a 12" "Rushover" column yielding the following fractions:

| Fraction No. | Vapor Temp. | Liquid Temp. | mm Hg Pressure | Weight of Fraction |
|---|---|---|---|---|
| 1 | 34/27 | 61/100 | 150/145 | 16.4 |
| 2 | 46/82 | 76/97 | 3.0 | 61.0 |
| 3 | 84 | 99 | 3.0 | 42.8 |
| 4 | 85 | 118 | 3.0 | 58.6 |
| 5 | 120 | 214 | 3.0 | 12.6 | and then fractionally distilled on a 12" Mirror-Goodloe column yielding the following eight fractions:

| Fraction No. | Vapor Temp. | Liquid Temp. | mm Hg Pressure | Reflux Ratio | Wgt. of Fraction |
|---|---|---|---|---|---|
| 1 | 34/57 | 89/96 | 3.0 | 9:1 | 14.4 |
| 2 | 81 | 98 | 3.0 | 9:1 | 17.2 |
| 3 | 85 | 103 | 3.0 | 9:1 | 21.8 |
| 4 | 85 | 103 | 3.0 | 9:1 | 19.2 |
| 5 | 104 | 132 | 3.0 | 9:1 | 23.4 |
| 6 | 104 | 132 | 3.0 | 9:1 | 25.5 |
| 7 | 104 | 132 | 3.0 | 9:1 | 23.4 |
| 8 | 99 | 226 | 3.0 | 9:1 | 14.0 |

The resulting material is trapped out on a GLC column and is ascertained by means of NMR, mass spectral and infrared analyses to have the structure:

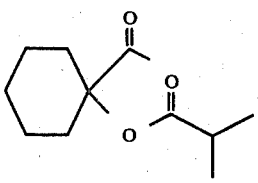

The compound having the structure:

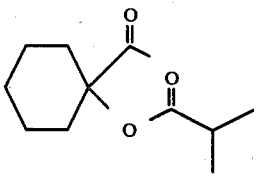

has a green, floral, herbaceous, rather peppery aroma. From a flavor standpoint, it has a sweet, fruity, estery, strawberry-like, ionone-like aroma and flavor characteristic at 5 ppm.

EXAMPLE IV

BASIC RASPBERRY FLAVOR FORMULATION

The following basic raspberry flavor formulation is prepared:

| Ingredients | Parts by Weight |
|---|---|
| Vanillin | 5 |
| Maltol | 5 |
| Parahydroxy Phenyl Butanone | 5 |
| Alpha Ionone (10% in food-grade ethanol) | 2 |
| Ethyl Butyrate | 16 |
| Dimethyl Sulfide | 1 |
| Isobutyl Acetate | 16 |
| Ethyl Acetate | 20 |
| Gacial Acetic Acid | 20 |
| Acetaldehyde 100% | 10 |
| Propylene Glycol | 900 |

The basic raspberry formulation is divided into two parts; one part without anything added and the second part with 10% 1-acetyl-cyclohexyl acetate. The flavor is compared at the rate of 100 ppm in water with and without the addition of the 10% 1-acetyl-cyclohexyl acetate. The flavor with the 1-acetyl-cyclohexyl acetate produced according to Example I has a more raspberry juice-like aroma with a fuller, more natural juice-like taste and a better, longer lasting raspberry juice after taste. Therefore a bench panel of experts prefers the flavor with the addition of the 1-acetyl-cyclohexyl acetate.

EXAMPLE V

RASPBERRY FLAVOR

The following mixture is prepared:

| Ingredient | Parts by Weight |
|---|---|
| Para-hydroxy benzyl acetone | 5 |
| Vanillin | 2 |
| Maltol | 3 |
| Alpha-ione (1% solution in propylene glycol) | 15 |
| Isobutyl acetate | 15 |
| Ethyl butyrate | 5 |
| Ethyl acetate | 5 |
| Dimethyl sulfide (10% solution in propylene glycol) | 5 |
| Acetic acid | 15 |
| Acetaldehyde | 20 |
| Propylene glycol | 910 |

1-Acetyl-cyclohexyl isobutyrate prepared according to Example III is added to the above mixture at rates of 0.02%, 0.04%, 0.06%, 0.1% and 0.15%. Flavor formulations with this derivative are then compared with a flavor formulation without the ester at the rate of 0.01% in water (100 parts per million) by a bench panel. The flavor formulation containing the ester has a strong delicate raspberry aroma with strawberry nuances which characteristics are not reproduced by the flavor formulation which does not contain the said ester derivative.

EXAMPLE VI

The following mixture is prepared:

| Ingredients | Parts by Weight |
|---|---|
| Natural Raspberry Concentrate Juice | 2½% |
| Water | 85% |
| Sugar syrup (37½° Baume) | 12½% |

The natural juice-like taste of this raspberry juice is imparted in increased strength by addition of either of the following materials at the rate of from 0.02 ppm up to 1.0 ppm:

(a) 1-acetyl-cyclohexyl acetate produced according to Example I;
(b) 1-acetyl-cyclohexyl isobutyrate prepared according to Example III;
(c) A 50:50 weight:weight mixture of 1-acetyl-cyclohexyl isobutyrate prepared according to Example III and 1-acetyl-cyclohexyl acetate prepared according to Example I

EXAMPLE VII

FLAVOR FORMULATION

The following mixture is prepared:

| Ingredients | Parts by Weight |
|---|---|
| Vanillin | 20 |
| Allyl caproate | 10 |
| Citral | 20 |
| Amyl butyrate | 35 |
| Orange oil | 45 |
| Ethyl butyrate | 75 |
| Ethyl acetate | 185 |
| Amyl acetate | 185 |
| Lemon oil | 400 |

1-Acetyl-cyclohexyl acetate produced according to Example I was added to 975 grams of the above mixture which was then called "Test Composition". A control composition was prepared by adding 25 grams of additional lemon oil to 975 grams of the above mixture.

The test and control compositions were added to the food products described hereinafter and the proportions shown for 100 kilograms of material to be flavored:

Cake: 20 grams
Pudding: 5–10 grams
Cooked sugar: 15–20 grams

Cooked sugar—100 ml of sugar syrup (prepared by dissolving 1 kilogram of sucrose in 600 ml of water) and 20 grams of glucose were mixed together and slowly heated to 145° C. The flavor was added and the mass allowed to cool and harden.

Pudding—To 500 ml of warmed milk were added with stirring a mixture of 60 grams sucrose and 3 grams of pectin. The mixture was boiled for a few seconds and the flavor was added. The mixture was allowed to cool.

Cake—The following ingredients were mixed together:

Vegetable margarine: 100 grams
Sodium chloride: 1.5 grams
Sucrose: 100 grams
Eggs: 2
Flour: 100 grams The flavor was added and the mass was cooked for 40 minutes at 180° C. The finished foodstuff samples were tested by a panel of trained persons who had to express their views about the flavor of the samples. All members of the panel declared with no hesitation that the test samples had a more distinguished fruity and woody note than the control samples and at the same time a red-berry character.

EXAMPLE VIII

A. POWDER FLAVOR COMPOSITION 20 grams of the flavor composition of Example V is emulsified in a solution containing 300 grams gum acacia and 70 grams water. The emulsion is spray-dried with a Bowen Lab Model Drier utilizing 260 c.f.m. of air with an inlet temperature of 500° F., an outlet temperature of 200° F., and a wheel speed of 50,000 rpm.

B. SUSTAINED RELEASE FLAVOR

The following mixture is prepared:

| Ingredients | Parts by Weight |
| --- | --- |
| Liquid raspberry flavor composition of Example IV | 20 |
| Propylene glycol | 9 |
| Cab-O-Sil ® M-5 (Brand of Silica produced by the Cabot Corporation of 125 High Street, Boston, Mass. 02110; Physical Properties: Surface area: 200 m²/gm Nominal particle size: 0.012 microns Density: 2.3 lbs/cu.ft.) | 5.00 |

The Cab-O-Sil is dispersed in the raspberry flavor composition of Example IV with vigorous stirring, thereby resulting in a viscous liquid. 71 Parts by weight of the powder flavor composition of Part A, supra, is then blended into the said viscous liquid, with stirring, at 25° C. for a period of 30 minutes resulting in a dry, free flowing sustained release flavor powder.

EXAMPLE IX

10 Parts by weight of 50 Bloom pigskin gelatin is added to 90 parts by weight of water at a temperature of 150° F. The mixture is agitated until the gelatin is completely dissolved and the solution is cooled to 120° F. 20 Parts by weight of the liquid flavor composition of Example IV is added to the solution which is then homogenized to form an emulsion having particle size typically in the range of 2–5 microns. This material is kept at 120° F. under which conditions the gelatin will not jell.

Coacervation is induced by adding, slowly and uniformly 40 parts by weight of a 20% aqueous solution of sodium sulphate. During coascervation the gelatin molecules are deposited uniformly about each oil droplet as a nucleus.

Gelation is effected by pouring the heated coascervate mixture into 1,000 parts by weight of 7% aqueous solution of sodium sulphate at 65° F. The resulting jelled coacervate may be filtered and washed with water at temperatures below the melting point of gelatin, to remove the salt.

Hardening of the filtered cake, in this example, is effected by washing with 200 parts by weight of 37% solution of formaldehyde in water. The cake is then washed to remove residual formaldehyde.

EXAMPLE X

CHEWING GUM

100 Parts by weight of chicle are mixed with 4 parts by weight of the flavor prepared in accordance with Example VIII. 300 Parts of sucrose and 100 parts of corn syrup are added. Mixing is effected in a ribbon blender with jacketed side walls of the type manufactured by the Baker Perkins Co.

The resultant chewing gum blend is then manufactured into strips 1 inch in width and 0.1 inches in thickness. The strips are cut into lengths of 3 inches each. On chewing, the chewing has a pleasant, long lasting raspberry flavor.

EXAMPLE XI

CHEWING GUM

100 Parts by weight of chicle are mixed with 18 parts by weight of the flavor prepared in accordance with Example VIII. 300 Parts of sucrose and 100 parts of corn syrup are then added. Mixing is effected in a ribbon blender with jacketed side walls of the type manufactured by the Baker Perkins Co.

The resultant chewing gum blend is then manufactured into strips 1 inch in width and 0.1 inches in thickness. The strips are cut into lengths of 3 inches each. On chewing, the chewing gum has a pleasant, long lasting raspberry flavor.

What is claimed is:

1. A process for augmenting or enhancing the aroma or taste of a foodstuff or chewing gum comprising the step of adding to a foodstuff composition or a chewing gum composition from 0.02 parts per million up to about 50 parts per million by weight of said foodstuff composition or chewing gum composition of a 1-acetyl-cyclohexanol ester selected from the group consisting of 1-acetyl-cyclohexanol acetate having the structure:

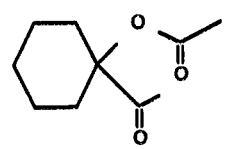

and 1-acetyl-cyclohexanol isobutyrate having the structure:
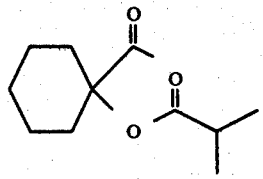
2. the process of claim 1 wherein the 1-acetyl-cyclohexanol ester is 1-acetyl-cyclohexanol butyrate having the structure:
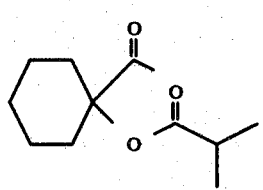
3. The process of claim 1 wherein the 1-acetyl-cyclohexanol ester is 1-acetyl-cyclohexanol acetate having the structure:
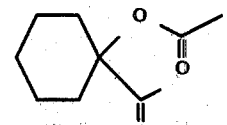
* * * * *